United States Patent [19]

Nishio et al.

[11] Patent Number: 5,557,317
[45] Date of Patent: Sep. 17, 1996

[54] VIDEO-ON-DEMAND SYSTEM WITH PROGRAM RELOCATION CENTER

[75] Inventors: Makoto Nishio; Sho-ichiro Nakai; Makiko Yoshida, all of Tokyo, Japan

[73] Assignee: NEC Corporation, Tokyo, Japan

[21] Appl. No.: 447,244

[22] Filed: May 22, 1995

[30] Foreign Application Priority Data

May 20, 1994 [JP] Japan .................................. 6-106995

[51] Int. Cl.⁶ .................................................. H04N 7/14
[52] U.S. Cl. ................................................. 348/7; 348/12
[58] Field of Search .................................. 348/7, 13, 12; 455/5.1

[56] References Cited

U.S. PATENT DOCUMENTS 4,763,317   12/1985   Lehman et al. .
5,247,347   9/1993    Litteral et al. ............................ 358/85
5,371,532   12/1994   Gelman et al. ............................ 348/7
5,408,465   4/1995    Gusella et al. ............................ 370/17

FOREIGN PATENT DOCUMENTS 0625856   11/1994   European Pat. Off. .

OTHER PUBLICATIONS

"Networks and Algorithms—An Introductory Approach" by Alan Dolan and Joan Aldous, John Wiley & Sons, pp. 487–492.

*Primary Examiner*—Victor R. Kostak
*Assistant Examiner*—Martha J. Hopkins
*Attorney, Agent, or Firm*—Sughrue, Mion, Zinn, Macpeak & Seas

[57] ABSTRACT

A video-on-demand system provides video signals from a video information provider to any one of subscriber terminals. The system comprises video storage devices distributed over a network area for storing a video program supplied from the video information provider. A video gateway receives a subscriber request from a subscriber terminal and produces a control signal according to the information stored in a database. A service request monitor analyzes subscriber requests received by the video gateway to produce a list of recorded calls. A program relocator analyzes the list to determine first and second video storage devices between which the video program is to be transferred. A transfer command generator is responsive to the determined video storage devices for supplying a program transfer command signal to the video gateway for updating the database. A switched telecommunication network is responsive to the program transfer command signal for transferring the video program from the first video storage device to the second video storage device and responsive to the control signal for establishing a connection between the subscriber terminal and the second video storage device,

10 Claims, 4 Drawing Sheets

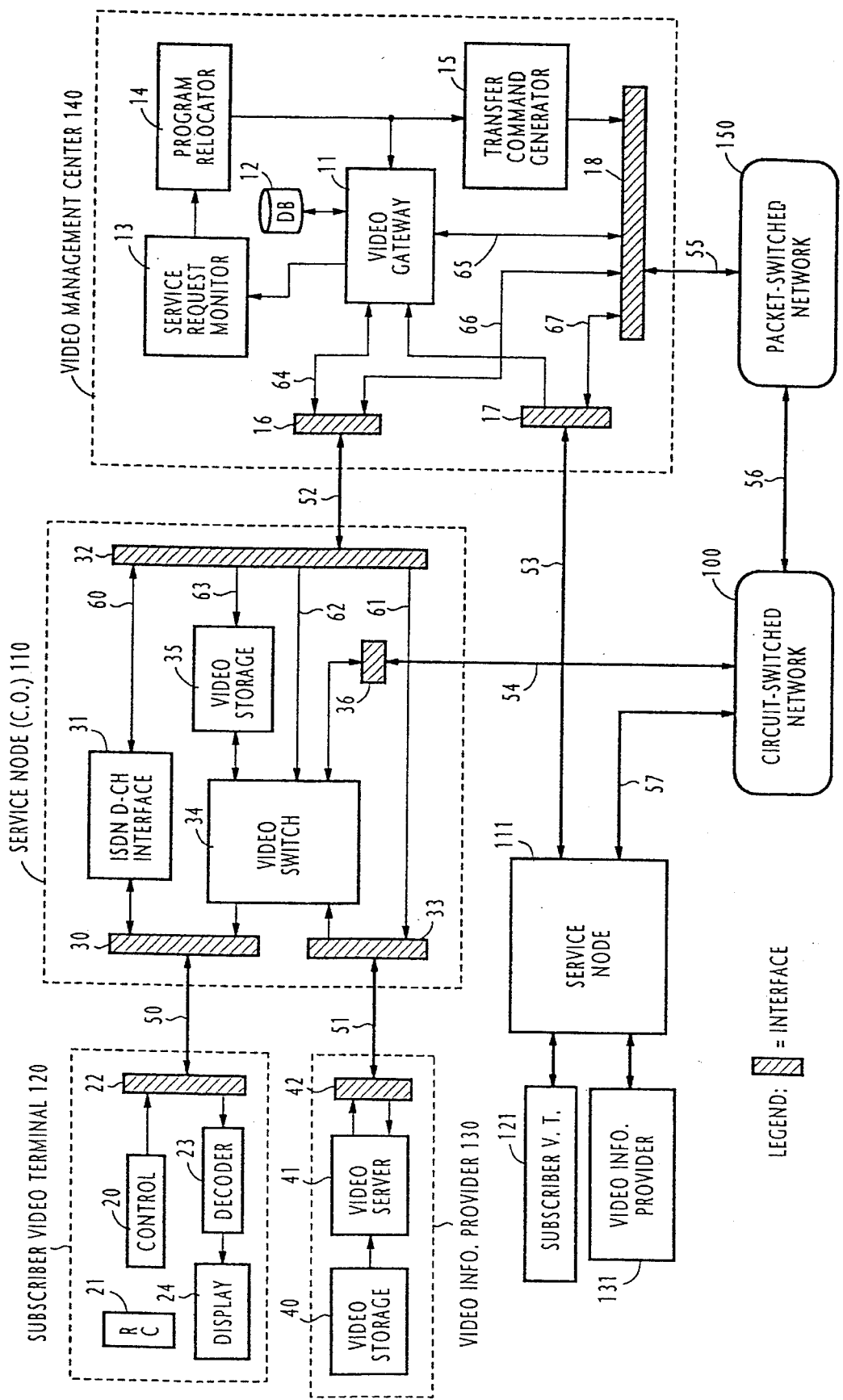

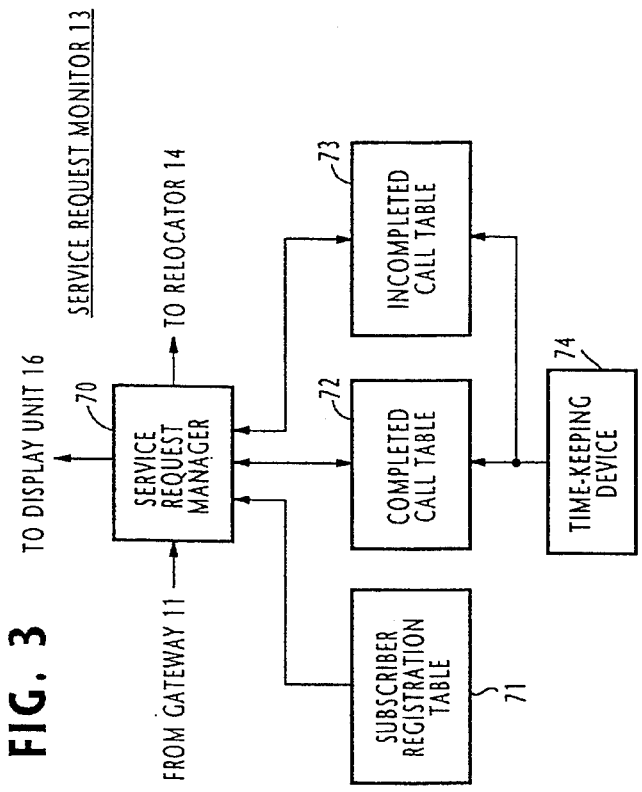

PROGRAM TRANSFER LIST

| PRGM NO. | COPY SOURCE NODE ID | COPY SINK NODE ID | COMMAND |
|---|---|---|---|
| PRGM 1 | XXX | AAA | TRANSFER |
| PRGM 2 | XXX |  | ERASE |
| PRGM 3 | XXX | ZZZ | TRANSFER |

VIDEO-ON-DEMAND SYSTEM WITH PROGRAM RELOCATION CENTER

BACKGROUND OF THE INVENTION

1. Field of the Invention

The present invention relates to a video-on-demand system using a public switched telephone network (PSTN).

2. Description of the Related Art

A video-on-demand system is disclosed in U.S. Pat. No. 5,247,347. According to the known system, a public switched telephone network provides digital video signals from a video information provider to one or more of a plurality of subscriber terminals. Video command signals from a subscriber are transported through a packet switching system to the video information provider and a video program is transmitted over a circuit switching system to the subscriber. To facilitate rewind, fist-forward and still-frame control, a temporary storage is provided in the central offices of the PSTN for storing the video program requested by the subscriber. However, since the location of temporary storage is permanently fixed with respect to the associated program provider, a situation can occur where a large number of wideband transmission links are needed for transmitting a video program to remote subscribers.

SUMMARY OF THE INVENTION

It is therefore an object of the present invention to provide relocation of copies of video programs from a video service node to another service node that is as close as possible to the requesting subscriber, so that a smaller number of wideband links is required for transmitting a video program.

According to the present invention, there is provided a video-on-demand system for providing video signals from a video information provider to any one of a plurality of subscriber terminals. The system comprises a plurality of video storage devices distributed over a network area for storing a video program supplied from the video information provider. A video gateway receives a subscriber request from a subscriber terminal and produces a control signal according to the information stored in a database. A service request monitor is provided for analyzing subscriber requests received by the video gateway to produce a list of recorded calls. A program relocator analyzes the list to determine first and second video storage devices between which the video program is to be transferred. A transfer command generator is responsive to the program relocator for supplying a program transfer command signal to the video gateway for updating the database. A switched telecommunication network is responsive to the program transfer command signal for transferring the video program from the first video storage device to the second video storage device and responsive to the control signal for establishing a connection between the subscriber terminal and the second video storage device.

Specifically, the video storage devices are located respectively in service nodes which are interconnected by inter-node links through the switched telecommunication network. In the program relocator, a first minimum cut set is formed with inter-node links which extend between a first node storing a requested video program and at least one of the subscriber terminals contained in the list, wherein the total information volume of the inter-node links of the first minimum cut set is equal to the maximum volume of information that can be transmitted from the first node. If the total information volume of the links of the first minimum cut set is smaller than a prescribed threshold, a second node located on the subscriber side of the first minimum cut set is selected, and a second minimum cut set is formed with inter-node links whose total information volume is equal to the maximum volume of information that can be transmitted from the second node. If the total information volume of the links of the second minimum cut set is equal to or greater than the prescribed threshold, a copy source node nearest to the second node is determined which stores a copy of the requested program, A program transfer list is produced, containing a program identifier identifying the requested video program, a first node identifier identifying the copy source node, and a second node identifier identifying the second node. The program transfer generator is responsive to the program transfer list for producing a program transfer command signal for transferring the copy of the requested video program from the copy source node to the second node.

BRIEF DESCRIPTION OF THE DRAWINGS

The present invention will be described in further detail with reference to the accompanying drawings, in which:

FIG. 1 is a block diagram of a video-on-demand system according to the present invention;

FIG. 2 is an illustration of data stored in a database;

FIG. 3 is a schematic block diagram of a program relocator;

FIGS. 4a, 4b and 4c are illustrations of data stored in a subscriber registration table, a completed call table and an incompleted call table, respectively;

DETAILED DESCRIPTION

Figure 5:
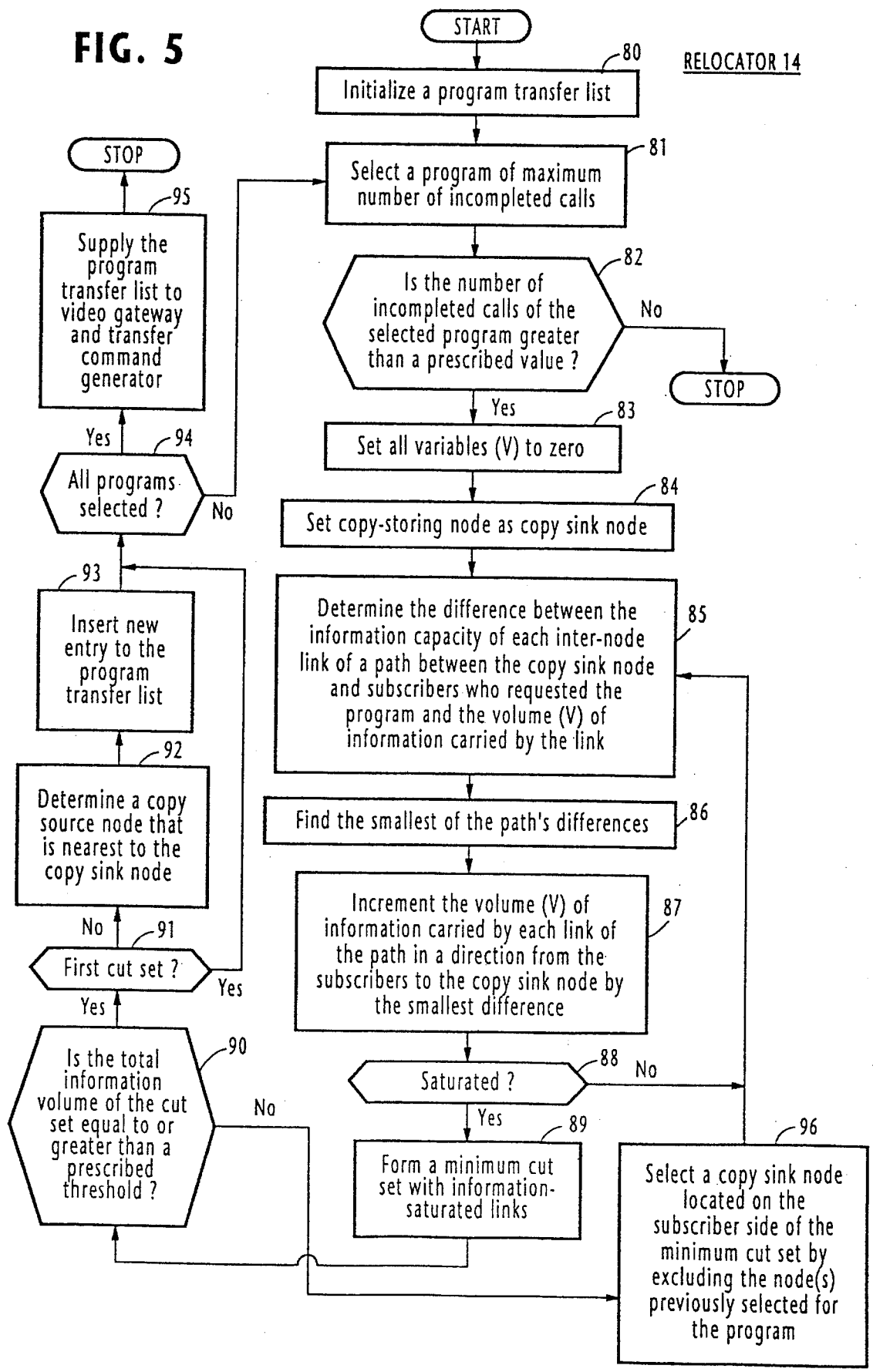
FIG. 5 is a flowchart for illustrating the operation of the program relocator.

Referring now to FIG. 1, the video-on-demand system of the present invention includes a wideband circuit-switched network 100 and a narrowband packet-switched network 150 which form part of an ISDN (Integrated Services Digital Network) public switched telephone network (PSTN). PSTN central offices which incorporate a video transfer functionality of the present invention are designated as video service nodes. For simplicity, only two service nodes 110 and 111 of identical configuration are illustrated. Connected to these video service nodes are subscriber video terminals and video information providers. For convenience, only two subscriber video terminals 120 and 121 and two video information providers 130 and 131 are shown in FIG. 1. While service nodes 110 and 111 are shown respectively serving both subscriber video terminals 120 and 121 and video information providers 130 and 131, the service nodes may serve only subscriber video terminals or only video information providers. Video service nodes 110 and 111 are connected to a video management center 140, which forms part of the public-switched telephone network and includes a video gateway 11 and a database 12.

As shown in FIG. 2, the database 12 at the management center stores management data mapping a list of program identification numbers, corresponding VIP identifiers of the VI providers which hold the video programs identified by the program IDs, and a service node to which these VI providers are connected.

Each subscriber video terminal includes a video controller 20 which receives infrared-light command signals from a hand-held remote controller 21 to convert the signals into a line code format. A service request signal containing a desired program identifier, a corresponding VIP identifier and the network address of the subscriber terminal 120 is generated by video controller 20 and coupled through a network interface 22 to a fiber optic subscriber line 50 and propagated to a subscriber interface 30 of the video service node 110, where it is applied to an ISDN D-channel interface 31 for transmission to the video gateway 11 via line 60, a network interface 32, and a fiber optic cable 52 to a network interface 17 and a line 64 of the video management center.

Video gateway 11 is responsive to a service request signal from the system subscribers for accessing the database 12 to obtain a corresponding video program title and a VIP identifier and produces a switching signal containing the requested program title, the VIP identifier and the network address of the requesting subscriber, the switching signal being applied to the packet-switched network 150 to establish a connection. If the desired program is stored in the video information provider 130, a logical connection is established in the packet-switched network 150 for coupling a mode control signal from the video gateway 11 through line 65, interface 18, line 66, interface 16, where it is transmitted over fiber cable 52 to the interface 32 at service node 110 and coupled to a line 61 leading to a provider interface 33, and sent over a fiber optic cable 51 to video information provider 130. If a copy of the program is stored in the video storage 35 at node 110, the mode control signal from the video gateway 11 is supplied to it via line 63.

Service node 110 includes a wide-band video switch 34 such as digital cross-connect system or ATM (asynchronous transfer mode) switch, and a video storage 35. Video gateway 11 controls the packet-switched network 150 to establish another virtual circuit from the video gateway 11, through line 65, interface 18, line 66, interface 16, cable 52, interface 32, line 62 to the video switch 34 of the desired service node and a switching signal is sent from the gateway 11 through the established virtual connection to the video switch 34 to establish a wide-band physical connection for transporting a video program.

The video information provider 130 has a video storage 40 in which data-compressed video programs are stored. A video server 41 is connected between the video storage 40 and an interface 42 to receive a transfer command signal from the service node 110 to transfer a copy of a requested video program from the video storage 40 to the video storage 35 of the node 110. As will be described later in detail, the program in the video storage 34 may be further copied and transferred to the video storage of another service node (copy sink node as will be termed later) that is nearest to a requesting subscriber in response to a transfer command signal from the video management center 140.

A narrow-band circuit is established through the packet-switched network 150 between the requesting subscriber terminal and a desired video information provider to allow various control signals to be exchanged between them. If the desired program is located in the video information provider 130, the control signal from the terminal 120 propagates through cable 50, interfaces 30, 31, line 60, interface 32, cable 52, interface 16, line 64, video gateway 11 line 65, interface 18, through cable 55 to packet-switched network 150, and back to interface 18, line 66, interface 16, cable 52, interface 32, line 61, interface 33 to the video information provider 130. If the desired video program resides in the provider 131, a narrowband logical connection will be established from the packet-switched network 150 to the provider 131 through line 67 and an interface 17 which is connected via a fiber optic cable 53 to service node 111.

In response to a subscriber's mode control signal received via line 61, interface 33 and cable 51, the video server 41 controls the video storage 40 to transmit a video program identified by the requested program title to the user terminal 120 via the video switch 34. A network interface 36 is provided in the video service node 110 for interfacing the video switch 34 to the circuit-switched network 100 via a fiber optic cable 54.

If the provider 131 has a requested video program, video gateway 11 controls the packet-switched network 150 via interface 18 and fiber optic cable 55 to establish a wideband physical connection through the circuit-switched network 100 between service nodes 110 and 111 via cables 54 and 57 and video switch 34.

Subscriber video terminal 120 includes a decoder 23 connected to the network interface 22 to decompress the transmitted video program into the original format and displayed on a video monitor 24. Subscribers may wish to send mode control signals such as rewind, fast-forward and still-frame using remote controller 21. These mode control signals are transmitted to the video gateway 11 through the narrowband virtual circuit already established through the D-channel interface 31. On receiving a mode control signal from a subscriber, the video gateway 11 sends it through the virtual circuit established through the packet-switched network 150 to a video information provider or a copy sink node, so that the reproducing mode of the video signal is modified according to the subscriber's remote controller 21.

To facilitate the mode control functionality, according to the prior art system, a copy of the video program is initially transferred to the video storage 35 of a service node to which the subscriber is connected, i.e., node 110, and the mode control signal is supplied from the gateway 11 to the video storage 35 via a control line 63, instead of to the video server 42. However, the location of the video storage 35 is permanently fixed in relation to the program provider 130. Therefore, a situation can occur where a large number of wideband transmission links are needed for transmitting a video program to remote subscribers.

The present invention provides relocation of copies of video programs from a video service node (copy source node) to another service node (copy sink node) that is as close as possible to the requesting subscriber, so that a smaller number of wideband links are required for transmitting a video program. For this purpose, the video management center 140 includes a service request monitor 13, a program relocator 14, and a transfer command generator 15.

As shown in FIG. 3, the service request monitor 13 comprises a service request manager 70, a subscriber registration table 71, a completed call table 72, an incompleted call table 73, and a time-keeping device 74 that supplies time-of-day data to tables 72 and 73. The input of service request manager 70 is connected from the video gateway 11 to receive service request signals and an output of the manager is connected to the relocator 14. Service request monitor 70 is connected to the display unit 16 to provide a display of the analyzed data in the form of a histogram, for example.

As illustrated in FIG. 4a, the subscriber registration table 71 includes a map defining relationships between subscriber telephone numbers and service node identifiers of the service nodes to which the subscribers are connected. FIG. 4b shows details of the call-completion table 72 in which the subscriber telephone numbers are mapped to video program numbers used by the corresponding subscribers, start-of-use time data indicating time-of-day at which the program transmissions were started, and end-of-use time data indicating time of day at which the transmissions were terminated. Completed call table 72 is used to collect data for billing the subscribers. Incompleted call table 73 maps the subscriber telephone numbers to requested video program numbers and time data indicating time of day at which service requests of incompleted calls were placed (FIG. 4c). Service request manager 70 receives subscriber's service request signals via the video gateway 11 for updating the data stored in tables 72 and 73.

Relocator 14 is programmed to operate in a manner as illustrated in FIG. 5 to supply a program transfer list to the video gateway 11 and transfer command generator 15. The operation of relocator 14 is based on the Ford-Fulkerson method as described in "Networks and Algorithms, An Introductory Approach" by Alan Dolan and Joan Aldous, John Wiley & Sons, pages 487–492. The Ford-Fulkerson method is a classical approach to the network flow problem developed by L. R. Ford and D. R. Fulkerson in 1962. According to this method, if every path from the source to the sink in a network has a full forward edge (link) or an empty backward edge (link), then the flow is maximal. This fact is proven by first going through a network graph and identifying the first full forward or empty backward link on every path. Specifically, starting with a zero flow, the flow can be increased by at least the smallest amount of unused capacity on any link on a path from source to sink and decreasing the flow on Links from sink to source by the same amount, continuing in this way for all links on the path by that amount until all links on the path are filled to capacity. This set of links "cuts" the graph in two parts, and the total flow of the cut is equal to the total flow for the network.

In FIG. 5, at periodic intervals, the relocator 14 receives the contents of the incompleted call table 73 from service request monitor 13. In response, the operation of relocator 14 starts with block 80 in which a program transfer list (see FIG. 6) is initialized. The program transfer list contains requested video program numbers, identifiers of copy source nodes in which the programs are stored, identifiers of copy sink nodes, and command signals indicating whether program copies are to be transferred from copy source nodes to copy sink nodes, or copies in the copy source nodes are to be erased.

In block 81, a program of maximum number of incompleted calls is selected. In block 82, a test is made to determine whether the number of incompleted calls of the selected program is greater than a prescribed value. If video programs are well distributed throughout the network and no program transfer is necessary, the number of such incompleted calls will be lower than the prescribed value. In such instances, the program terminates, and no action is taken. Otherwise, the number of incompleted calls will exceed the prescribed value, and control branches at block 82 to block 83 to set all variables V which represent the volumes of information carried by each inter-node link of a network graph.

Figures 6, 7:
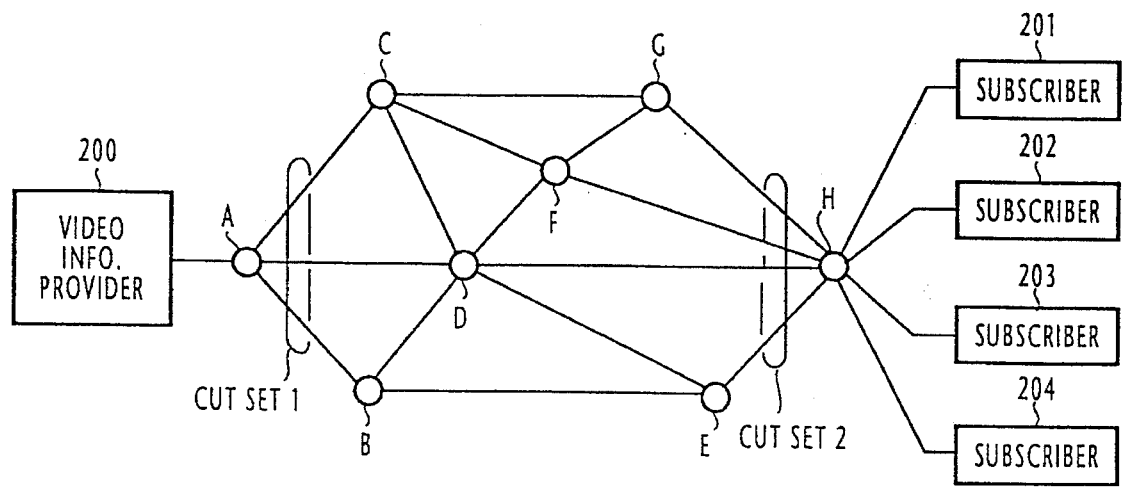
FIG. 6 is an illustration of a program transfer list generated by the program relocator.
FIG. 7 is an example network graph for describing the process of determining a copy source node and a copy sink node.

Consider a graph of FIG. 7 for a network consisting of video service nodes A, B, C, D, E, F, G and H where a program of a video information provider 200 is stored in service node A and requested by subscribers 201, 202, 203 and 204. The information flow of each link is incremented, starting from a zero flow and the incremented information volume for each link is stored into a corresponding cell in the network graph table which is marked by a circle.

In block 84, a service node which stores the selected program is determined and set as a copy sink node. In block 85, the relocator 14 determines the difference between the information capacity of each internode link on a path of the network graph between the copy sink node and the subscribers who requested the program (whose telephone numbers are contained in the information from the service request monitor 13) and the volume (V) of information carried by the link. The smallest of the differences of the given path is determined in block 86. In block 87, the volume (V) of information carried by each link on the path is incremented by an amount equal to the smallest of the differences in a direction from the subscribers to the copy-storing node.

Blocks 85, 86 and 87 are repeatedly executed for every path of the network from the subscribers to the copy sink node until it is impossible to further increment the total volume of information carried by the network. Under such conditions, the network is said to be "saturated". Block 88 determines whether the network is saturated. If not, control returns to block 85; otherwise, it proceeds to block 89 to form a minimum cut set with the information saturated links.

For simplicity, assume that, in the network graph of FIG. 7, all links of the network have equal information capacity. A first link between nodes A and B, a second link between nodes A and C, and a third link between nodes A and D, are all filled to the capacity of the respective paths from node A to node H, and no further information can be incremented. This set of links "cuts" the network graph in two parts and is termed "minimum cut set".

In block 90, a test is made to determine whether the total information volume of the "cut set" is equal to or greater than a prescribed threshold, e.g., the total volume of information requested by the subscribers. If the information volume of the cut set is equal to or greater than the threshold, control proceeds to decision block 91 to check to see if the minimum cut set is the first one, and if it is, control moves past blocks 92 and 93 to block 94 to determine whether all the programs contained in the information supplied from the service request monitor 13 have been selected.

If a negative decision is made at block 91, control branches to block 92 to determine a copy source node that is nearest to the copy sink node, and a new entry is inserted, in block 93, to the program transfer list indicating the program number of the selected program, the identifiers of both copy source node and copy sink node, and control proceeds to block 94. If the answer is negative at block 94, control returns to block 81 to repeat the above process for the next program. If the answer is affirmative at block 94, control proceeds to block 95 to supply the program transfer list to the video gateway 11 and transfer command generator 15, and the program terminates. In response, the gateway 11 updates the database 12 and the transfer command generator 15 generates a transfer command signal and forwards it to the packet-switched network 150.

If node 110 is determined to be a copy source node and node 111 as a copy sink node, the video switches 34 in nodes 110 and 111 and the circuit-switched network 100 are controlled by the appropriate transfer command signals to establish a wideband connection and a copy of the program in video storage 35 is transmitted through video switch 34 via interface 36, cable 54, circuit-switched network 100 and the video switch of node 111 to the video storage of node 111, and the program stored in video storage 35 at node 110 is erased.

If the information volume of the cut set is smaller than the prescribed threshold, control branches at block 90 to block 96 to select a copy sink node located on the subscriber side of the minimum cut set by excluding one or more nodes that are previously selected for the program. As a result, if the initial copy storing node is node A in the network graph of FIG. 7, the point of determination of a further minimum cut set is moved to a new copy sink node, say, node F. Blocks 85 through 88 are then repeated until the network is again saturated with respect to the new copy sink node, and a second minimum cut set is formed again in block 89. In block 90, the test is performed again for the minimum cut set.

Assume that a request to the selected program was made by four subscribers which are shown connected to node H as indicated by numerals 201–204 in FIG. 7. In this case, the total volume of information carried by the first minimum cut set is smaller than the volume of information requested by the subscribers. Thus, a second minimum cut set is searched for, using the node F as a copy sink node. Then it is determined whether links from node H to nodes D, E, F and G form a second minimum cut set whose total information carrying capacity is equal to or greater than the requested volume. In such an instance, the decision is made, in block 90, to be affirmative, and a copy source node is determined, in block 92, that is nearest to the new copy sink node. In the network graph of FIG. 7, the nearest node to the new copy sink node F may be node A which was initially the copy storing node.

If the second attempt to search for the minimum cut set fails, the above process will be repeated by moving the point of determination of a minimum cut set further toward the subscribers.

What is claimed is:

1. A video-on-demand system for providing video signals from a video information provider to any one of a plurality of subscriber terminals, comprising:

a plurality of video storage devices distributed over a network area for storing one or more video programs supplied from said video information provider;

a database;

a video gateway for receiving subscriber requests from said subscriber terminals, a service request monitor for analyzing subscriber requests received by the video gateway to produce a list of recorded calls;

a program relocator for analyzing said list to identify a first video storage device and selectively identifying a second video storage device between which said video program is to be transferred;

a transfer command generator responsive to said program relocator for producing a program transfer command signal, said video gateway being responsive to the program transfer command signal for updating said database; and a switched telecommunication network responsive to said program transfer command signal for transferring said video programs from the first video storage device to the second video storage device.

2. A video-on-demand system as claimed in claim 1, wherein said video storage devices are located respectively in a plurality of video service nodes which are interconnected by inter-node links through said switched telecommunication network, and wherein said program relocator comprises:

means for (a) forming a first minimum cut set with inter-node links between a first node storing a requested video program and at least one of said subscriber terminals contained in said list of recorded calls, the total information volume of the inter-node links of said first minimum cut set being equal to the maximum volume of information that can be transmitted from said first node, (b) determining a second node located on the subscriber side of the first minimum cut set if the total information volume of the links of the first minimum cut set is smaller than a prescribed threshold, (c) forming a second minimum cut set of inter-node links whose total information volume is equal to the maximum volume of information that can be transmitted from said second node, and (d) determining a copy source node storing a copy of said requested program nearest to said second node if the total information volume of the links of said second minimum cut set is equal to or greater than said prescribed threshold; and means for producing a program transfer list containing a program identifier identifying the requested video program, a first node identifier identifying said copy source node, and a second node identifier identifying the second node, wherein said program transfer command generator comprises a means responsive to said program transfer list for producing said program transfer command signal for transferring said copy of the requested video program from the copy source node to the second node.

3. A video-on-demand system as claimed in claim 1, wherein said switched telecommunications network comprises a wideband switched network and a narrowband switched network for respectively establishing a wideband connection and a narrowband connection between said subscriber terminal and said second video storage device.

4. A video-on-demand system as claimed in claim 3, wherein said narrowband switched network is a packet-switched network.

5. In a video-on-demand system for providing video signals from a video information provider to any one of a plurality of subscriber terminals, comprising, a plurality of video storage devices for storing a copy of a video program supplied from said video information provider, a database, a video gateway for receiving a subscriber request from one of said subscriber terminals, said plurality of video storage devices being respectively located in video service nodes which are distributed over a network area and interconnected by links through a switched telecommunication network, a method for relocating said copy of video program, comprising the steps of:

a) analyzing subscriber requests received by the video gateway to produce a list of recorded calls, b) analyzing said list to identify a first video storage device and select a second video storage device between which said video program is to be transferred;

c) producing a program transfer command signal depending upon the identification of said first and second storage devices; and d) supplying said program transfer command signal to said switched telecommunication network so that said video program is transferred from the fist video storage device to the second video storage device said video gateway for updating said database.

6. A method as claimed in claim 5, wherein the step (b) comprises the steps of:

b1) forming a first minimum cut set with inter-node links between a first node storing a requested video program and at least one of the subscriber terminals contained in said list of recorded calls, the total information volume of the inter-node links of said first minimum cut set being equal to the maximum volume of information that can be transmitted from said first node;

b2) determining a second node located on the subscriber side of the first minimum cut set if the total information volume of the links of the first minimum cut set is smaller than a prescribed threshold;

b3) forming a second minimum cut set of inter-node links whose total information volume is equal to the maximum volume of information that can be transmitted from said second node; and b4) determining a copy source node storing a copy of the requested video program nearest to said second node if the total information volume of the links of the second minimum cut set is equal to or greater than said prescribed threshold, wherein the step (c) comprises the steps of:

c1) producing a program transfer list containing a program identifier identifying said copy of the video program, a first node identifier identifying the copy source node, and a second node identifier identifying the second node; and c2) responding to said program transfer list to produce said program transfer command signal for transferring the copy of the program from the copy source node to the second node.

7. A video-on-demand system for providing video signals from a video information provider to any one of a plurality of subscriber terminals, comprising:

a plurality of video storage devices distributed over a network area for storing one or more video programs supplied from said video information provider;

a database;

a video gateway for receiving subscriber requests from said subscriber terminals, a service request monitor for analyzing subscriber requests received by the video gateway to produce a list of recorded calls;

a program relocator for analyzing said list to determine first and second video storage devices between which said video program is to be transferred such that a number of links between said second video storage device and said subscriber terminal is less than a number of links between said first video storage device and said subscriber terminal;

a transfer command generator responsive to said program relocator for producing a program transfer command signal, said video gateway being responsive to the program transfer command signal for updating said database; and a switched telecommunication network responsive to said program transfer command signal for transferring said video programs from the first video storage device to the second video storage device.

8. A video-on-demand system as claimed in claim 7, wherein said video storage devices are located respectively in a plurality of video service nodes which are interconnected by inter-node links through said switched telecommunication network, and wherein said program relocator comprises:

means for (a) forming a first minimum cut set with inter-node links between a first node storing a requested video program and at least one of said subscriber terminals contained in said list of recorded calls, the total information volume of the inter-node links of said first minimum cut set being equal to the maximum volume of information that can be transmitted from said first node, (b) determining a second node located on the subscriber side of the first minimum cut set if the total information volume of the links of the first minimum cut set is smaller than a prescribed threshold, (c) forming a second minimum cut set of inter-node links whose total information volume is equal to the maximum volume of information that can be transmitted from said second node, and (d) determining a copy source node storing a copy of said requested program nearest to said second node if the total information volume of the links of said second minimum cut set is equal to or greater than said prescribed threshold; and means for producing a program transfer list containing a program identifier identifying the requested video program, a first node identifier identifying said copy source node, and second node identifier identifying the second node, wherein said transfer program command generator comprises a means responsive to said program transfer list for producing said program transfer command signal for transferring said copy of the requested video program from the copy source node to the second node.

9. A video-on-demand system as claimed in claim 7, wherein said switched telecommunications network comprises a wideband switched network and a narrowband switched network for respectively establishing a wideband connection and a narrowband connection between said subscriber terminal and said second video storage device.

10. A video-on-demand system as claimed in claim 9, wherein said narrowband switched network is packet-switched network.

* * * * *